3,168,427
ADHESIVES FOR VINYL AROMATIC RESINS
Floyd B. Nagle, Midland, and Arthur F. Roche, Freeland, Mich., assignors to The Dow Chemical Company, Midland, Mich., a corporation of Delaware
No Drawing. Filed July 20, 1959, Ser. No. 828,070
7 Claims. (Cl. 156—307)

The present invention relates to a method of bonding together pieces of solid hydrocarbon resins, particularly vinyl aromatic resins, and to transparent, non-crazed resinous articles bonded by this method. The vinyl aromatic resins with which this invention is concerned are solid thermoplastic hydrocarbon polymers containing a total of at least 50 weight percent of one or more monovinyl aromatic hydrocarbons chemically combined therein.

More particularly this invention relates to a method of bonding together any two or more molded articles made from such vinyl aromatic hydrocarbon resins using an alkyl laurate, wherein the alkyl group contains from 1 to 4 carbon atoms, inclusive, whereby a strong, colorless, non-crazing bond is obtained.

When vinyl aromatic resin articles are bonded together with the usual adhesives such as, for example, perchloroethylene, toluene, xylene or solutions of vinyl aromatic resins in said adhesives, the bonded areas usually become crazed and discolored upon exposure to light. This crazing and discoloration is still apparent when the resinous articles contain light stabilizers. We have discovered that colorless, non-crazing bonds may be obtained when using the adhesives of the present invention.

In practicing the present invention one surface of the article to be bonded is coated with an alkyl laurate in any convenient manner such as brushing, and one surface of a second article is pressed firmly into place over the coated area, after which the joined article is allowed to set. The articles are conveniently joined at room temperature although higher temperatures may be used if faster rates of production are desired, and lower temperatures may be desirable when extremely thin films are to be joined together. The methyl, ethyl, propyl, isopropyl, butyl, sec-butyl, and t-butyl laurates are satisfactory adhesives, although the butyl laurates require somewhat more time to set than the lower alkyl esters.

The present invention may be further illustrated by the following examples, but is not to be construed as limited thereto:

*Example I*

Polystyrene of transparent nature was injection molded into test specimens each having dimensions of 2 x 2½ x 3/16 inches. Ethyl laurate was applied to one surface of one specimen over an area of ½ x 2 inches with a spatula and a second specimen pressed firmly into place. The article was allowed to dry at room temperature. Samples of the above were exposed to Florida sunlight for 3 months and showed no crazing in the bonded area. Discoloration in the bonded area was no different than in the unbonded portions. The unbonded area broke under strain rather than the bonded lap.

In a manner similar to that of Example I other resinous articles were bonded together using laurate adhesives as shown in the following table. In each case the bonds were found to be clear and free of blushing.. When broken by hand the break did not occur at the bond site.

| Adhesive | Polymers Bonded |
|---|---|
| Ethyl laurate | Polystyrene to a copolymer of 75 weight percent styrene and 25 weight percent α-methyl styrene. |
| Methyl laurate | Do. |
| Sol'n of 10 weight percent polystyrene in ethyl laurate. | Polystyrene to polystyrene. |
| Sol'n of 10 weight percent polystyrene in methyl laurate. | Do. |
| Methyl laurate | Do. |
| Do | Polystyrene to styrene-butadiene copolymer. |
| Ethyl laurate | Do. |
| Butyl laurate | Do. |
| Do | Polystyrene to polystyrene. |

Various modifications may be made in the present invention without departing from the spirit or scope thereof, and it is understood that we limit ourselves only as defined in the appended claims.

We claim:
1. A method of bonding together pieces of normally solid thermoplastic monovinyl aromatic hydrocarbon resins which method comprises coating at least one surface to be bonded with liquid material selected from the group consisting of an alkyl laurate, wherein the alkyl group contains from 1 to 4 carbon atoms, inclusive, and solutions of said solid monovinyl aromatic hydrocarbon resins in said alkyl laurates as the bonding agent, pressing a surface of a second article of said solid monovinyl aromatic hydrocarbon resin into place over the coated area and allowing the joined surfaces to set.
2. The method of claim 1 wherein the alkyl laurate is ethyl laurate.
3. The method of claim 1 wherein the alkyl laurate is methyl laurate.
4. The method of claim 1 wherein the alkyl laurate is butyl laurate.
5. The method of claim 1 wherein the polymeric material of at least one of the pieces is polystyrene.
6. The method of claim 1 wherein the polymeric material of at least one of the pieces is a copolymer of styrene and α-methyl styrene.
7. The method of claim 1 wherein the polymeric material of at least one of the pieces is a copolymer of styrene and butadiene.

References Cited in the file of this patent
UNITED STATES PATENTS

| 2,485,910 | Myers et al. | Oct. 25, 1949 |
| 2,628,180 | Iverson | Feb. 10, 1953 |
| 2,834,749 | Salyer et al. | May 13, 1958 |

OTHER REFERENCES

"Materials in Design Engineering," January 1958, Riley (pages 129–134 relied on).
"Organic Coating Technology" (Payne), published by John Wiley & Sons Inc. (New York), 1958 (page 383 relied on).